(12) United States Patent
Muthusamy et al.

(10) Patent No.: US 11,468,245 B1
(45) Date of Patent: Oct. 11, 2022

(54) METHOD FOR CLAUSE GENERATION

(71) Applicants: Palaniappan Muthusamy, Sharon, MA (US); Justin E. Pounds, Bristol, RI (US)

(72) Inventors: Palaniappan Muthusamy, Sharon, MA (US); Justin E. Pounds, Bristol, RI (US)

(73) Assignee: Leaflet Corporation, Westwood, MA (US)

( * ) Notice: Subject to any disclaimer, the term of this patent is extended or adjusted under 35 U.S.C. 154(b) by 98 days.

(21) Appl. No.: 16/681,929

(22) Filed: Nov. 13, 2019

Related U.S. Application Data

(60) Provisional application No. 62/760,323, filed on Nov. 13, 2018.

(51) Int. Cl.
| | | |
|---|---|---|
| *G06F 40/56* | (2020.01) | |
| *G06F 40/289* | (2020.01) | |
| *G06F 16/332* | (2019.01) | |
| *G06F 16/35* | (2019.01) | |

(52) U.S. Cl.
CPC .......... *G06F 40/56* (2020.01); *G06F 16/3328* (2019.01); *G06F 16/353* (2019.01); *G06F 40/289* (2020.01)

(58) Field of Classification Search
CPC ...... G06F 16/93; G06F 40/166; G06F 40/197; G06F 40/30; G06F 16/35; G06F 3/0482; G06F 40/186; G06F 40/205; G06F 16/285; G06F 16/313; G06F 16/353; G06F 16/683; G06F 11/3452; G06F 16/332; G06F 16/3329; G06F 16/3334; G06F 16/5846; G06F 16/3328; G06F 40/289; G06F 40/56; G06F 16/3344; G06F 40/10; G06F 16/00; G06F 16/30; G06F 7/24; G10L 15/1815
See application file for complete search history.

(56) References Cited

U.S. PATENT DOCUMENTS

| | | | | |
|---|---|---|---|---|
| 11,182,692 B2* | 11/2021 | Lacoste | ............... | G16H 50/70 |
| 11,216,896 B2* | 1/2022 | Stauffer | ............... | G06F 16/93 |
| 2014/0025608 A1* | 1/2014 | Miller | ................. | G06Q 10/10 |
| | | | | 706/12 |
| 2014/0068422 A1* | 3/2014 | Rajkumar | ............ | G06F 40/186 |
| | | | | 715/243 |
| 2014/0068426 A1* | 3/2014 | Potnis | ............... | G06F 40/131 |
| | | | | 715/256 |
| 2019/0213700 A1* | 7/2019 | Isomura | ............. | G06Q 50/188 |

FOREIGN PATENT DOCUMENTS

| | | | | | |
|---|---|---|---|---|---|
| CA | 2174413 C | * | 6/2009 | ............. | B42D 25/00 |
| EP | 687987 A1 | * | 12/1995 | ........... | G06F 17/274 |
| EP | 1524610 B1 | * | 3/2018 | ........ | G06F 17/30011 |

* cited by examiner

*Primary Examiner* — Linda Wong

(74) *Attorney, Agent, or Firm* — William L. Botjer

(57) ABSTRACT

A method for generating bespoke clause language for document or individual clause creation using machine learning and natural language processing. By capturing Author usage and preference data an application employing this method can extract, evaluate, compare, and produce clause language meeting an Author's specific requirements both mechanically, the clause appropriately matches the document purpose, and situationally, the clause appropriately matches the tone the Author wishes to convey in the document.

1 Claim, 10 Drawing Sheets

METHOD FOR CLAUSE GENERATION

FIELD OF THE INVENTION

The invention pertains to a method for using a combination of rules-based machine classification and natural language processing system to assist in automated document generation. Particularly, the invention pertains to using the system to extract, categorize, and suggest specific language based on a number of factors the system queries from the Author. Specifically, the invention relates to a novel method for classifying the suitability of the clause language for a particular purpose based on a series of rules input at the beginning of application use and further refined as a component of the machine learning algorithm. The invention further relates to the selection and use of the classified clauses in the generation of documents and templates.

BACKGROUND OF THE INVENTION

Conventional document abstraction methods and systems used in the processes of document automation, and contract lifecycle management usually extract information using natural language processing or tags within the document, and fill the extracted information into a database which can be referenced according to the needs of the application. For more complex agreements, this means that there can be hundreds, if not thousands, of data points which are processed and used as reference material for report generation. These reports provide a variety of information based on the criteria selected and the information extracted and catalogued by the application.

Traditionally, data extracted from documents is only used to generate reports or creating a centralized database of obligations, rights, and other captured attributes. While this use of the information provides value in managing the document lifecycle, such information is generally insufficient to provide insight for the document creation process. Rather it merely memorializes drafting biases and reinforces previously used, potentially suboptimal, drafting methodologies.

Classification and categorization of data is a common use for artificial intelligence systems. Machine learning algorithms are regularly used to identify patterns classify documents based on the content scanned. These systems, however, focus holistically on the document analyzing the result of the combination of clauses, rather than looking at and categorizing the clauses within the document. Additionally, these systems focus on the mere labeling of documents into certain pre-existing categories, rather than considering both the qualitative features of the document and novel classifications which may be available based upon application of the text.

It is apparent that a need exists for a new method by which clauses in a document can be extracted, categorized by use, classified by qualitative and operational factors, and stored in a manner that is accessible and useable for the creation of new documents based on a criteria set by the author during document creation. The present invention is directed toward providing such a system.

The present method provides for a machine learning based application whereby clauses within a document, regardless of agreement type or purpose, can be extracted based not solely on their mechanical purposes within a document, but additionally based on the qualitative properties of each clause. There are two primary requirements for the successful extraction of information via this method. First, the machine learning application must be taught to identify clause language based on the use of the clause within a document. Second, the machine learning algorithm must be taught to classify the language within the clauses against the rubric provided to determine the qualitative quantities of the language within the clause for the given context.

Beyond merely organizing and creating a database of these clauses ranked by use and qualitative measures, this invention seeks to further use the extracted clauses to create new agreements based on criteria input by the author. Upon input from an author, the machine learning application will reference the requirement against the clause language database a present a selection of options from which the author can decide which to use. Clause selection, or non-selection, is tracked and further utilized for the purpose of identifying the proper clause to use during document generation given a certain set of creation criteria. Further description of this process and other components of the invention will be apparent to those skilled in the art from the description that follows.

SUMMARY OF THE INVENTION

The method and system of this invention center around the innovative concept of selectively using clause information from a number of distinct documents to craft a bespoke agreement based on the author's current drafting preferences and within the constraints of organization tolerances. This invention allows an author to generate a clause specific to the immediate situation without the need to search through and synthesize the language from a number of prior agreements within the same or similar subject matter. Further, because of the breadth of the analysis provided by the machine learning application, the author is able to generate clause language based on the qualitative features of the language regardless of the specific use application in which the language was previously used.

The method for extracting clause language from within a document requires the use of a classification system known as the suitability rubric. First level language extraction identifies and categorizes clauses by use-case based on pre-identified categorizations present within the document (typically in the form of a table of contents, or present via section headers), or based on cross referencing language based on similar usage in clauses already taught to the machine learning application, identity classification. Second level extraction identifies and categorizes clause language base on a number of qualitative and operational attributes.

Once clause language is extracted, classified, and categorized according to use, the categorized clause language is stored in a database known as the Clause Library (111). Clause language may be further tagged with notes and/or given additional classification or categorization tags by means of human or machine interaction with the clauses stored within the database. Such interactions, assignments or removal of tags or categorizations, are captured and the machine learning application will reorient the baseline classification scores according to the modifications made.

Clause language is parsed by the machine learning application with a specific focus on the choice of words, use of mechanics (for example capitalization or idioms), and a comparison of terms (duration, cost, amount, etc.), to determine the relative location of these clause language metrics on the suitability rubric. As more documents are parsed according to the selected rubric, metric scoring for the rubric gains increasing accuracy to provide an accurate position based on the specific attributes of the organization employing the method. As some organizations may be more or less risk adverse, a clause ranking highly in attributes associated with risk may be categorized more unfavorably than the same such clause in an organization with much greater risk tolerance. In this way, the innovation creates a bespoke clause language environment based on the construction of the suitability rubric.

The final aspect of this invention occurs with an author is creating a new document, or adding a new clause into an existing document. At the time of generation, either based on a questionnaire completed by author identifying a target position on the suitability rubric, or by means of retrieving captured authoring data from an author who has previously used the system and established enough data to build a profile, the machine learning application will generate the selected document type or clause based on the closest matching clause language in the suitability rubric based on the author's target position. In the event the author is generating or modifying a single clause within an agreement, the author may be providing with a number of alternative clause language selections from which the author may select the language suitable for the current draft. This selection is captured and used to update the relative position of the clause language on the suitability rubric and is additionally used to update the author's drafting profile.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly.

DETAILED DESCRIPTION OF THE INVENTION

The invention consists of a method by which an Author can generate clause language specifically tailored to the Author's drafting preferences. While, this method includes the process by which clause language is extracted from a document, the primary innovation in this method is that clause language, once categorized by use case, is further classified based on a series of shifting factors, and then is mapped onto a suitability rubric. Based on organizational tolerances, previously captured Author preferences, and/or current Author input and requirements, clauses are selected based on their relative location to the Author's desired language attributes and delivered either as individual clauses, or used to generate an entire document.

In order to fully understand this Invention, we will go through an elucidation of the steps presented within each of the figures. Following this, we will provide an in-depth exploration of the preferred embodiment of the invention.

FIG. 1

Method Overview

Figure 1:
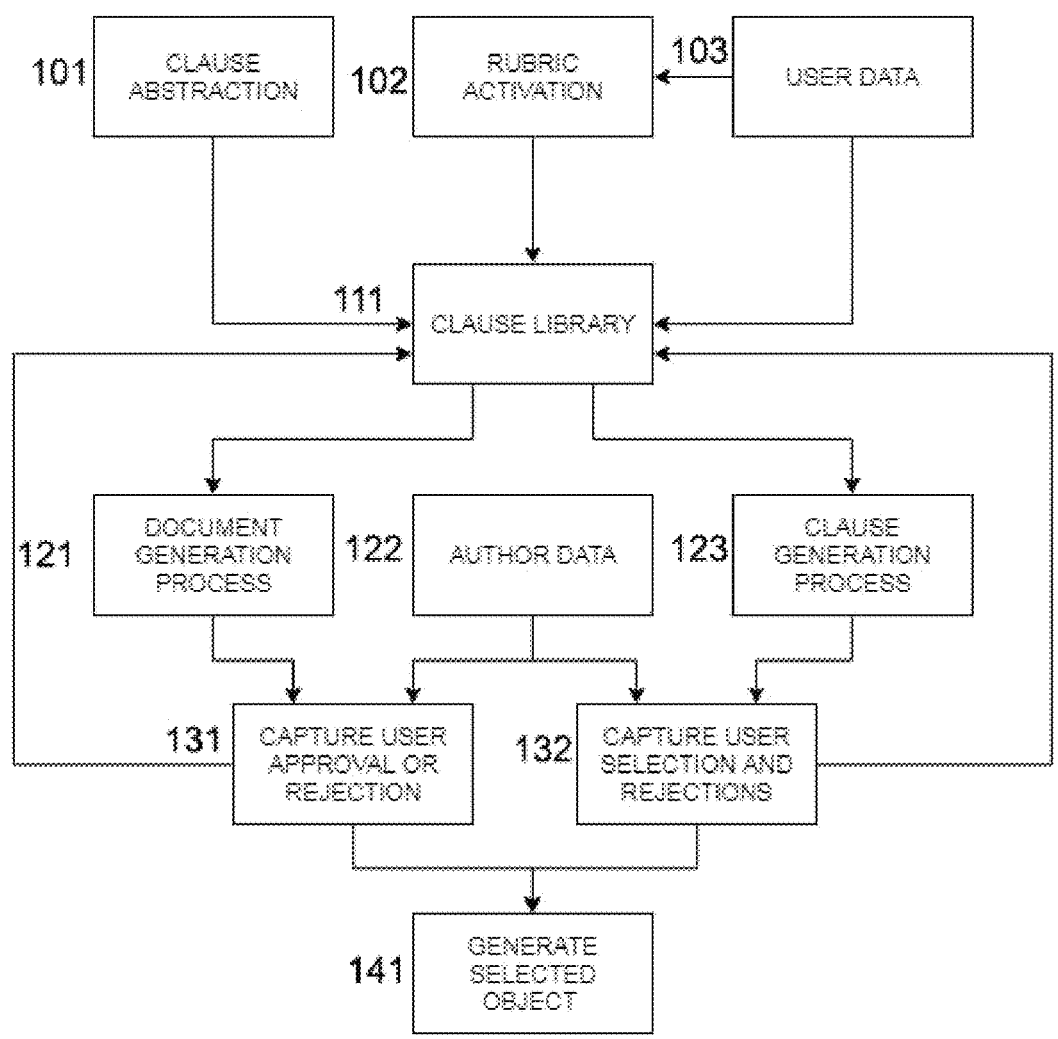
FIG. 1 is a block diagram containing an overview of the method.

Stage One: Abstraction is the first component of the method. Clause language abstraction, as shown in FIG. 1, 101 (Clause Abstraction), is a necessary pre-requisite to the implementation of this method. Clause abstraction is the process by which language is pulled from documents input to the system. As this method using prior drafting data provide baseline language for teaching the system, and to allow Authors the ability to leverage past language appropriate to the immediate context, this method requires a large amount of data, generally in the form of the previously completed documents, to be added to the system.

Stage Two: Language Extraction is carried out either through human extraction of data, or via machine extraction of information, FIG. 2, 201 (Extract clause language from documents uploaded or pre-existing in the document database). The breakdown of character strings and processing of such strings into language is known to those in the art of machine-based language processing. Such extraction is however a prerequisite for the unique classification method this invention provides. In the case of documents extraction of language breaks down swaths of text, typically organized by concept specific clauses, or concept driven sections, into a machine parsed text against which rules can be applied to collate, filter, and classify this text as defined by the parameters of the system.

Extraction is carried out at the clause level, as clauses are the driving factors in document generation or clause creation, however this invention acknowledges that extraction of smaller segments of document language is possible, but not employed for this implementation of the invention. Once extracted, clause language is stored in a database (clause library (111) in such a way that each clause language object can be tagged with the scores and attributes discussed further below.

Stage Three: Rubric Activation, FIG. 1, 102 (Rubric Activation) refers to the process by which the Suitability Rubric is engaged to generate appropriate language metrics based on a balancing of identity, operational, and qualitative metrics. In the preferred embodiment of this invention, rubric refers to a rule-set determining the specific criteria for language to be generated by the system. Once the system generates the metric values, the system engages the Clause Library (111) to locate the clause language which most closely matches the generated values, the suitability rubric matrix "SRM".

Figure 10:
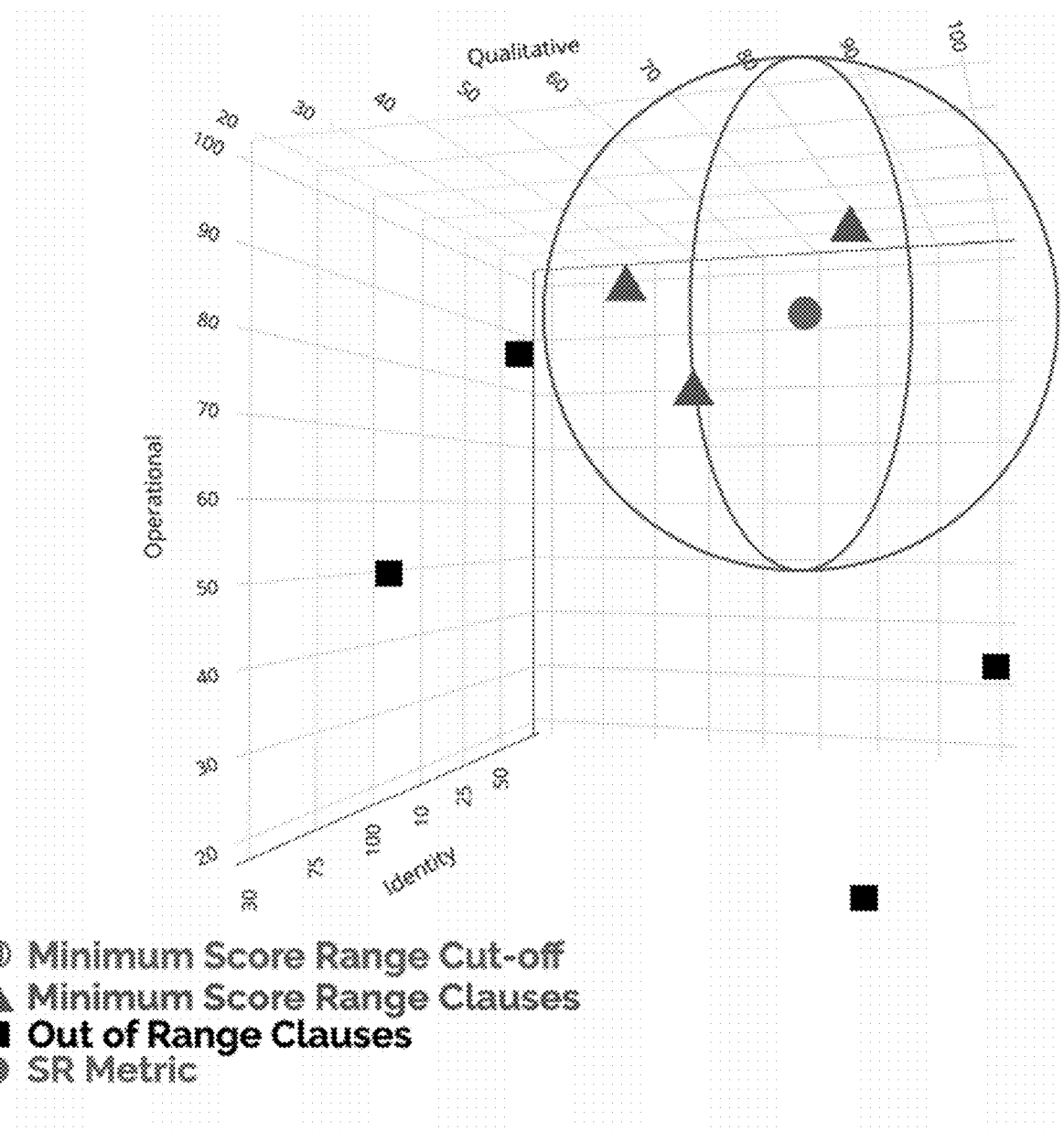
FIG. 10 is a visualization of the Suitability Rubric's use in balancing operational and qualitative metrics against the identification requirements of the legal concept to determine the optimal clause language available in the system.

FIG. 10 provides a visualization of how clause classification metrics are mapped to determine the relative location of Clause Library (111) Clauses against the generated metric requirement.

Clause language classification, weighting, and scoring are adjusted based on Author preferences in conjunction with organizational preferences and tolerances. On occasion, aberrant data may be flagged by the system for manual certification of classification. Additionally, as new document types are required for generation by the system, manually identification of the necessary legal concepts and pre-configuration of the tolerance requirements is required. To accomplish this manual intervention, this system requires the presence of, and the ability to interface with, a Clause Library (111) database. Herein all clause language can be accessed, reclassified, modified, and removed.

Stage Four: Language Selection enables the generation of whole documents or the presentation of a single clause based on the parameters selected by the Author. Depending on the type of generation required, the method will employ slightly different value weighting when generating the SRMs for the requested legal concepts. During whole document generation, FIG. 1, 121 (Document generation process) SRM values will favor compatibility with other language by focusing more highly on the use of uniform operational metrics and equally weighted qualitative metrics. During single clause generation, the SRM value generated seeks the optimal language for selection, regardless of other language already within the document, FIG. 1, 123 (Clause generation process), 141 (Generate selected object).

Stage Five: Data Capture occurs throughout the authoring process, FIG. 1, 103 (Data capture). The system captures and evaluates data for use in Organization Profile building, Author Profile building, and fluid classification adjustment. Data capture is primarily driven by acceptance and rejection, FIG. 1, 131 (Capture user approval or rejection), 132 (Capture user selection and rejections). When presented language is selected for use, the system looks for the presence of identity, and operational metrics within the selected language that may be unique from the other language in the document. If the system identifies the presence of such unique metrics, the remaining document language is reevaluated for component language which may necessitate the inclusion of additional classifications, as is discussed in detail below. Where qualitative metric scoring deviates highly from scores with scores from similar metrics in other language selected for use in the document, the system will make adjustments to the weighting and scoring of these fields. When presented language is rejected, the system makes a determination of the relative distance from the selected language and the generated metric value. Where the distance is larger (showing a greater deviation from the desired language) the system will make little to no adjustment to the classification of language. Where the relative deviation from the generated metric value is low and the deviation from the selected language is high, the system will exam the classification metrics in the rejected language for reclassification, During this period of evaluation, the rejected language will operate with a "true" value and a temporary deviation score based on the reclassification value,

FIG. 2

Figure 2:
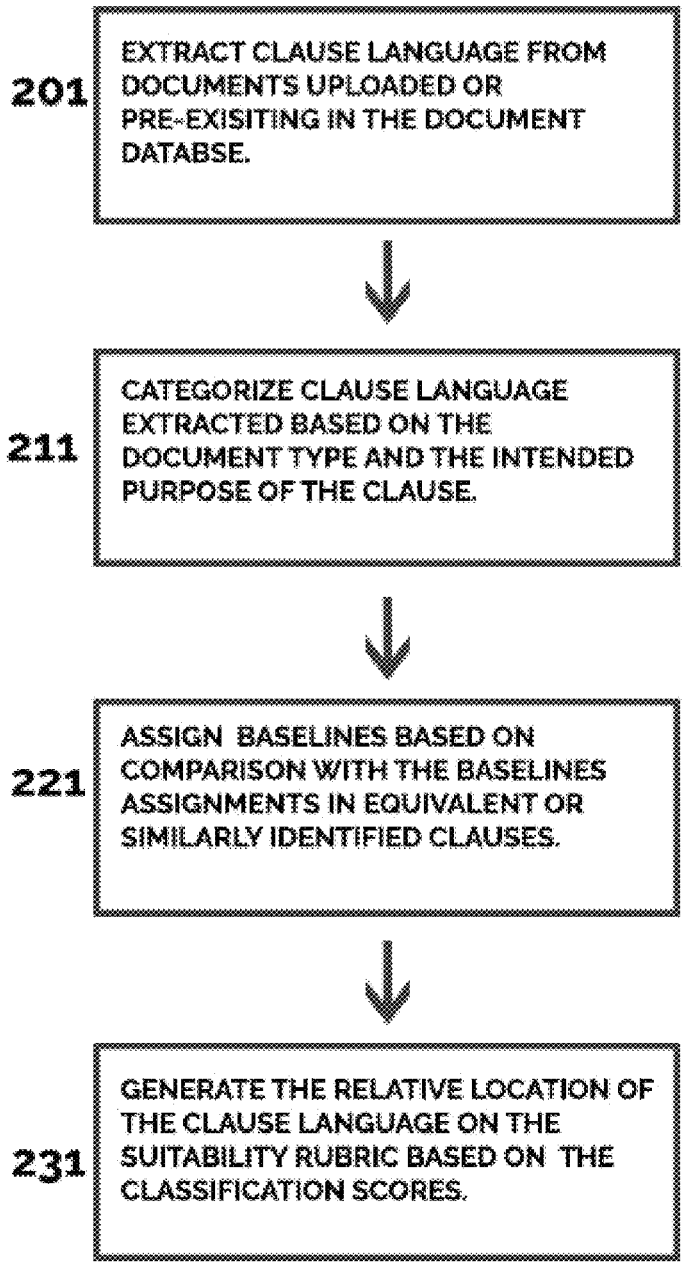
FIG. 2 is a block diagram that walks through the clause abstraction process that can be seen 101 of FIG. 1.

FIG. 2 is directed to the processing of extracted language. As described above in FIG. 1, 101, language extraction is be carried out through human extraction of data, or via machine extraction of information, FIG. 2, 201 (Extract clause language from documents uploaded from extraction or pre-existing in the document database). Extracted clause language is categorized by the utility of the clause, FIG. 2, 211 (Categorize Clause language extracted based on the type and the intended purpose of the clause). Utility categorization provides identity information for Clause Language. Identity classification is the process by which a cluster of language is assigned values designating the specification characteristics of that language. Consider a Governing Law clause in a non-disclosure agreement. The identity characteristics of such a clause are: the clause type (governing law); the document type (non-disclosure agreement); and the clause location (i.e. section 12 Miscellaneous), these characteristics provide the baseline traits necessary for selection and use of language; what should it go in, and where should it go.

Once extracted clause language is populated with identity classification, it is compared against other language in the system with similar identity classifications to create baseline traits. Additionally, baseline traits can be parsed from analysis of the language. For example, where a newly extracted notice clause may contain an operational trait not previous found in the document type or clause type, e.g. Suite Number, the system will create an assign this new operational trait to the clause. This new assignment is stored with other baseline traits in the Clause Library (111) FIG. 2, 221.

FIG. 2, 231, (Generate the relative location of the clause language on the suitability rubric based on the classification scores) is directed to the comparison of the newly extracted clause language to a SR Metric generated by a user during the authoring process. By mapping out the weighted average scores of the classification metrics, the system generates a three axis coordinate which is mapped against other clauses meeting the requirements generated by the user. This process is described in greater detail in FIG. 3.

FIG. 3

Figure 3:
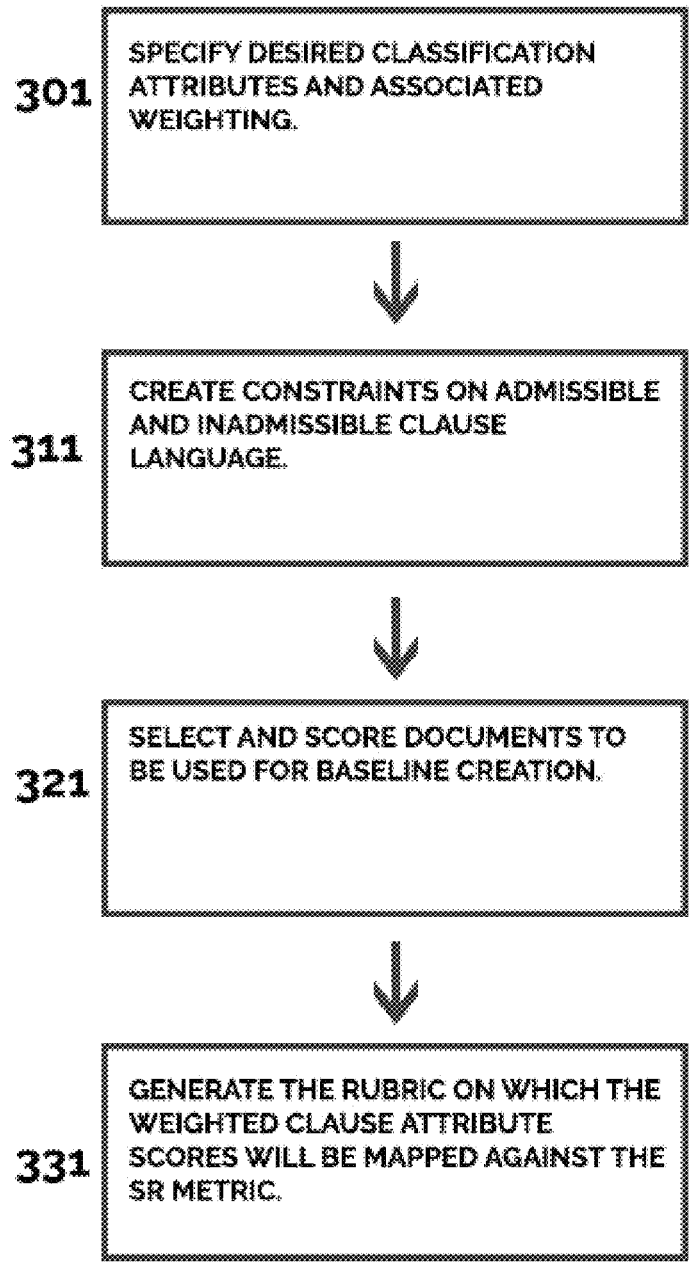
FIG. 3 is a block diagram that walks through the rubric activation process that can be seen in 102 of FIG. 1.

FIG. 3 is directed toward the creation of the Suitability Rubric and Suitability Rubric Metric SRM. (described in detail below) As described in FIG. 1, 102 (Rubric Activation) the Suitability Rubric and SRM are critical to the application of the preferred embodiment of this method.

FIG. 3, 301, (specify desired classification attributes and associated weighting) is the process by which the required attributes, such as Jurisdiction, or Enforceability are assigned to a legal concept. Concepts are used as the baseline to generate the suitability rubric for a given clause. Attributes within concepts are constrained by tolerances set at the system level. Attribute tolerance is a rule's-based validation that sets minimum and maximum values for values within attributes, FIG. 3, 311.

FIG. 3, 321 (Select and Score documents to be used for baseline creation) speaks to the initial and on-going manual training of the classification engine. During language extraction (FIG. 2), the system flags the presence or absence of triggering language to determine if a baseline attribute exists in a given concept. This classification process is based on rules created from manually scoring documents to teach the engine to look for the desired parameters.

Once all concept attributes, tolerances, and scores are assigned, a suitability rubric can be generated based on the user's desired use, FIG. 3, 331 (Generate the rubric on which the weighted clause attribute scores will be mapped against the SRM). The suitability rubric is based on the author's tolerances as established by the creation of a generation model. This process is further described in FIG. 4, 401 (Build the Generation Model)

FIG. 4

To generate a comparison between classified clause language, and the metrics of the suitability rubric, weighting is applied to clause baseline classification scores. Users create Generation Models to determine attribute weighting that is appropriate for the current context FIG. 4, 401.

Figure 4:
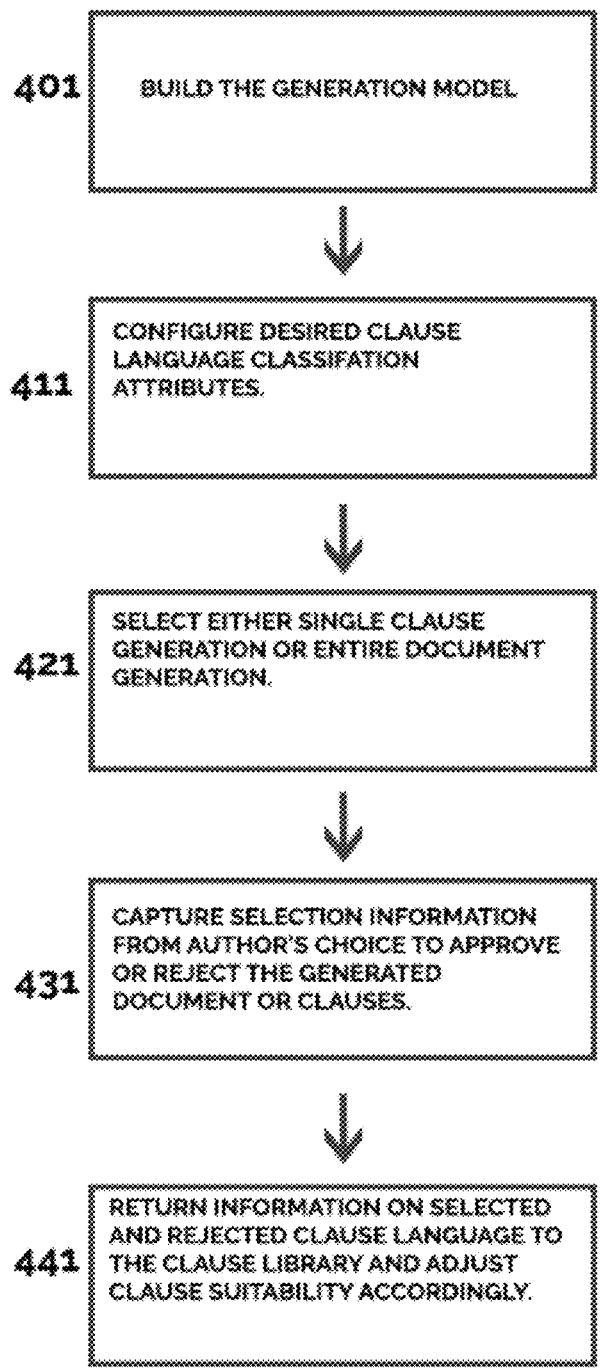
FIG. 4 is a block diagram that walks through the Author input requirements that can be seen in 122 of FIG. 1.

FIG. 4, 411 (Configure desired clause language classification attributes) speaks to the process by which user's apply the generation model for use at the creation of a document, or when editing a document. Once the model is applied, users select the desired form of generation, single clause or whole document, 421 (select either single clause or entire document generation). Language is presented matching the user's desired specification. The system then captures user selection feedback from interactions with the presented language, 431 (capture selection information from author's choice to approve or reject the generated documents or clauses). The system captures the selection, or non-selection of the clause by the user in addition to the user's profile identification number. This feedback is returned to the system and the baseline classification scores are updated, if necessary 441 (Return information on selected and rejected clause language to the Clause Library (111) and adjust clause suitability accordingly).

FIG. 5

Figure 5:
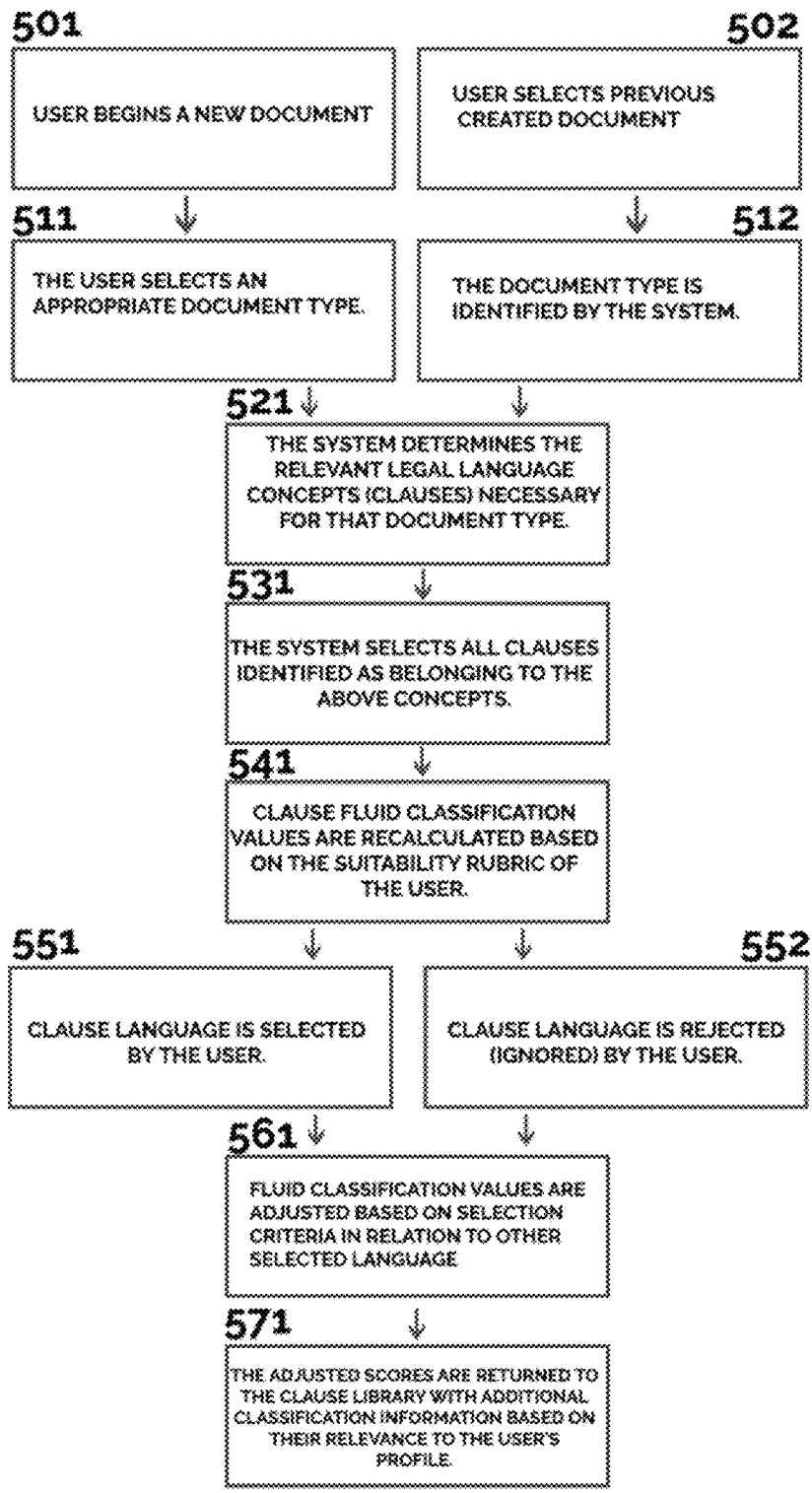
FIG. 5 is a block diagram that provides an overview of how language is processed and classified through the implementation of this method.

FIG. 5 provides a walkthrough of the user's interaction with the system to generate or select clause language.

The user starts by either creating/importing a new document, 501 (User begins a new document), or editing a document already present in the system, 502 (User selects a previously created document). At the beginning of document creation/import the user is prompted to assign a document type to the document, 511 (The user selects an appropriate document type, for example a non-disclosure agreement)). If the user is editing a pre-existing document, the system will pull the document type assignment from the designation that the user made at the time of the document's creation, or modified prior to the current interaction with the document, 512 (The document type is identified by the system).

Once the system has identified the document type assignment of the document, the system provides a concept pane to which users can tag and map clause language, or from which users can interact with concepts already tagged in the document, 521 (The system determines the relevant legal language concepts (clauses) necessary for that document type).

The system primes all clause language belonging to the identified concepts as belonging to the identified concepts for potential reclassification and suitability rubric mapping, 531 (The system selects all clauses identified as belonging to the above concepts). When a user interacts with a concept, the system generates a suitability rubric and SR Metric for the selected concept. The primed clause languages' baseline scores are reevaluated and a classification score is generated using the weighting requirements of the suitability rubric, 541 (Clause fluid classification values are recalculated based on the suitability rubric of the user).

The user either selects, 551 (Clauses language is selected by the user) or, ignores 552 (Clause language is rejected (ignored) by the user), clause language options presented for selection and use.

User selection information is captured and returned to the Clause Library (111) database strengthening the baseline classification scores of selected clauses and providing additional operational metric values related to the use of the clause by the current user 561 (Fluid classification values are adjusted based on selection criteria in relation to other selected language), 571 (The adjusted scores are returned to the Clause Library (111) with additional classification information based on their relevance to the user's profile).

FIG. 6

Figure 6:
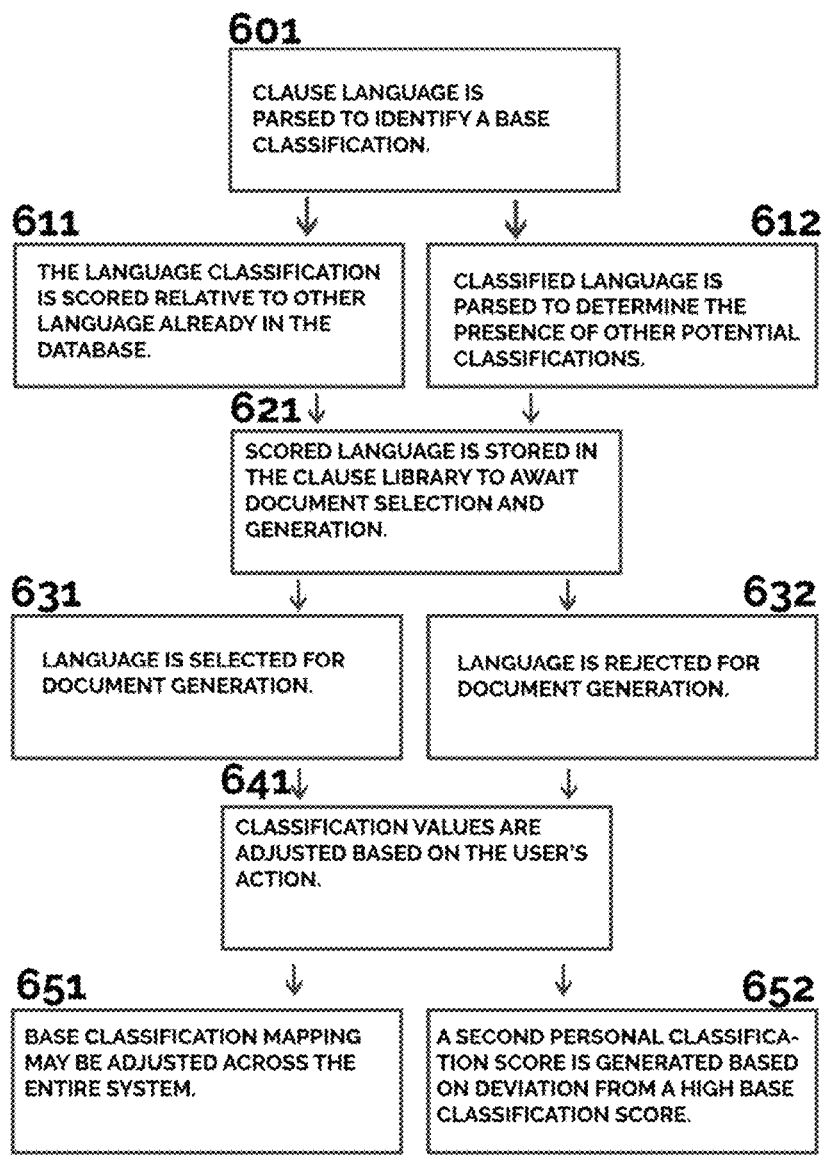
FIG. 6 is a block diagram that provides greater detail into the use and application of fluid classification during the extraction process which is described in 221 and 231 in FIG. 2.

FIG. 6 provides a walkthrough of the baseline classification process outlined in FIG. 2. FIG. 6, 601 (Clause language is parsed to identify a base classification) speaks to the initial language extraction process and the parsing of language by the system for Identity Classification. Once language has been identified, the clause is assigned to the appropriate concept. Language is then given a baseline score based on all attributes assigned to the concept 611 (The language classification is scored relative to other language already in the Clause Library (111) database). Where language contains potential attributes that are not currently assigned to the concept, the system will assign a baseline score for the new attribute 612 (Classified language is parsed to determine the presence of other potential classifications). Once baseline attribute scores are assigned, the clause language is stored in the Clause Library (111) database until it meets criteria for inclusion or selection, 621 (Scored language is stored in the Clause Library (111) to await document selection and generation).

FIG. 6, 631 (Language is selected for document generation) and 632 (Language is rejected for document generation) provide the basis for the adjustment of baseline classification scores. Based on a user's action or inaction, the baseline classification score of an attribute may be adjusted, 641 (Classification values are adjusted based on the user's action). If user action creates a fundamental shift in the scoring of an attribute, system-wide adjustment may be necessary, 651 (Base classification mapping may be adjusted across the entire system). Else, if this deviation seems to be local to the individual concept or user, a deviation score is generated, 652 (A second personal classification score is generated based on deviation from a high based classification score).

FIG. 7

Figure 7:
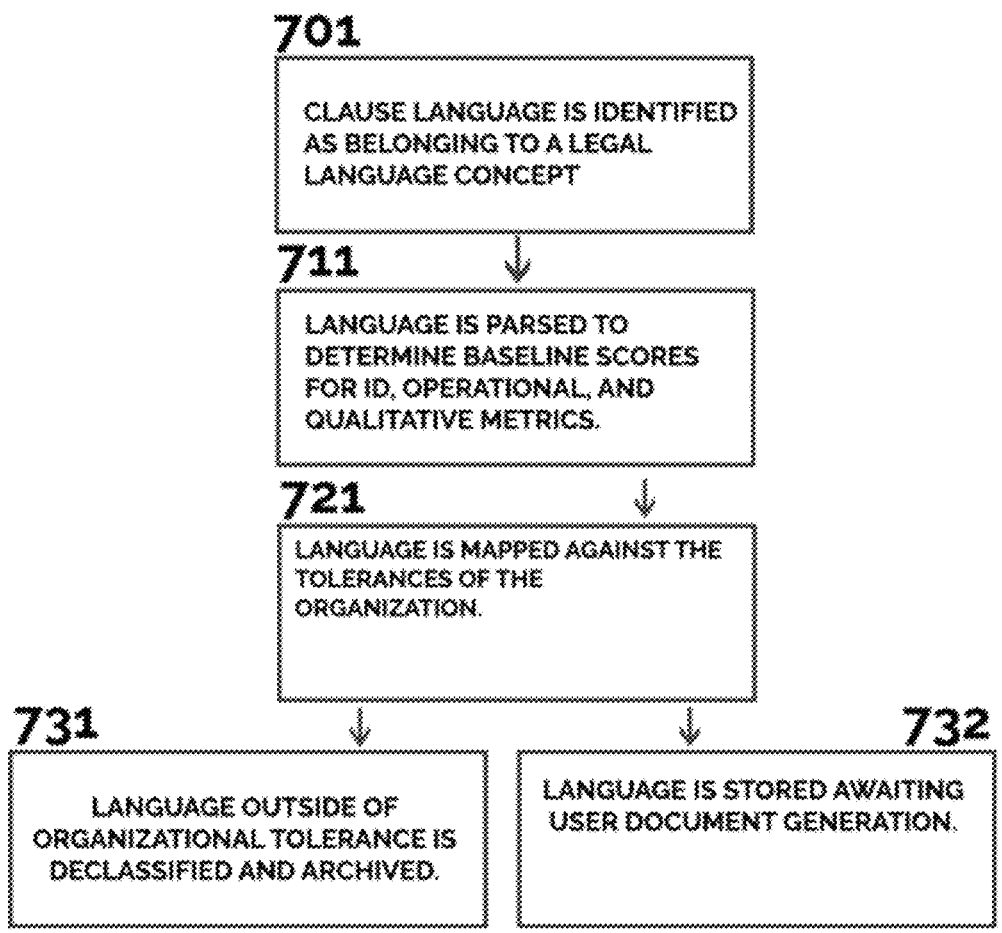
FIG. 7 is a block diagram that expands upon the use of concepts that can be seen in 621 of FIG. 6.

FIG. 7 provides a walkthrough of the use of the organizational tolerances to determine the appropriateness of clause language to a given context highlighted in FIG. 3, 311 (Create constraints on admissible and inadmissible clause language). Once clause language is assigned to a concept, FIG. 7, 701 (Clause language is identified as belonging to a legal language concept) language is either parsed to determine baseline attribute scores for the attributes present in the language, 711 (Language is parsed to determine baseline attribute scores for ID, Operational, and Qualitative Metrics). Baseline score values for the attributes are compared to the organization's tolerance ranges for the particular concept, 721 (language is mapped against the tolerances of the organization). Language outside organizational tolerance is removed from the concept and archived, 731 (Language outside of organizational tolerance is declassified and archived). Language meeting the requirements is store in the Clause Library (111) database to await selection or use, 732 (Language is stored awaiting user document generation).

FIG. 8

Figure 8:
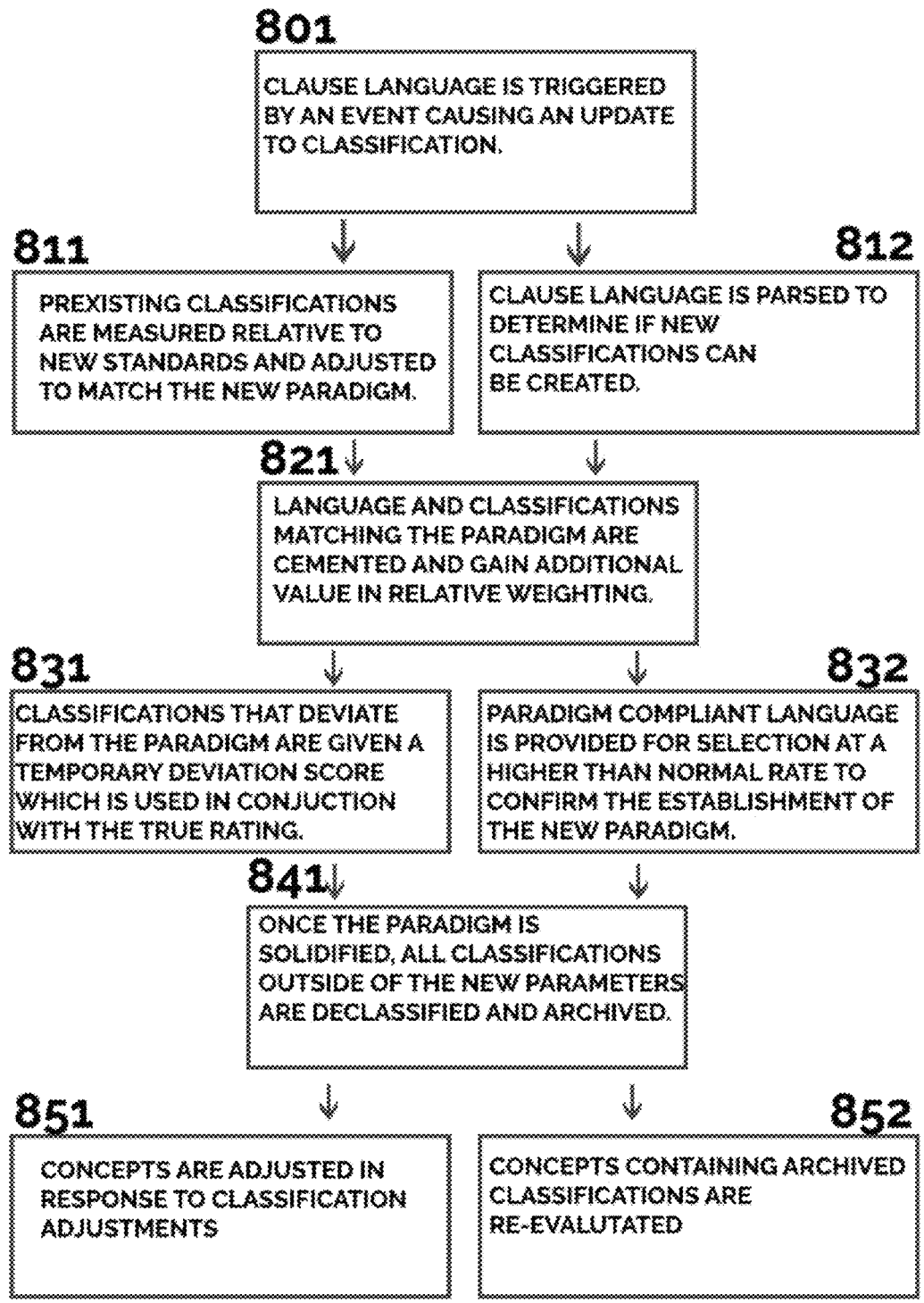
FIG. 8 is a block diagram that walks through the event-based trigger system used to update categorization, classification, and suitability of clause language as described in 103 of FIG. 1.

FIG. 8, 801 (clause language is trigged by an event causing an update to classification) is directed to process by which the system updates clause language classification scores and attributes illustrated in FIG. 1, 103 (User Data). Where an event-based trigger reclassifies the long accepted values of an attribute, —for example if the term of a non-disclosure agreement is 10 years for the vast majority of agreements in the system, a wave of users selecting a clause with a term of 15 years will trigger the system to reevaluate 10 years as the "optimal" term-, all clauses containing that attribute are reevaluated based on the new paradigm, 811 (Pre-existing classifications are measured relative to new standards and adjusted to match the new paradigm). When a new attribute is added to a concept, clause language associated with that concept is evaluated for the presence or absence of that attribute 812, (Clause language is parsed to determine if new classifications can be created). Language which matches the new paradigm or requirements is granted a score boost, 821 (Language and classifications matching the paradigm are cemented and gain additional value in relative weighting). Clauses that deviate from the paradigm are given a temporary deviation score 831, (Classifications that deviate from the paradigm are given a temporary deviation score which is used in conjunction with the true rating), while clauses that were compliant before the paradigm shift are provided for selection at a higher than normal rate to test if the shift is intentional, or an outlying event, 832 (Paradigm compliant language is provided for selection at a higher than normal rate to confirm the establishment of the new paradigm).

If a new paradigm is determined FIG. 8, 841 (Once the paradigm is solidified, all classifications outside of the new paradigm are declassified and archived) the system evaluates all clause language containing affected attributes. Where attribute span multiple concepts, 851 (concepts are adjusted in response to classification adjustments) clauses within other concepts are adjusted to match the new parameters. Where concepts contain previously archived clause language, that language is parsed to determine compliance with the new paradigm 852, (Concepts containing archived classifications are re-evaluated).

FIG. 9

Figure 9:
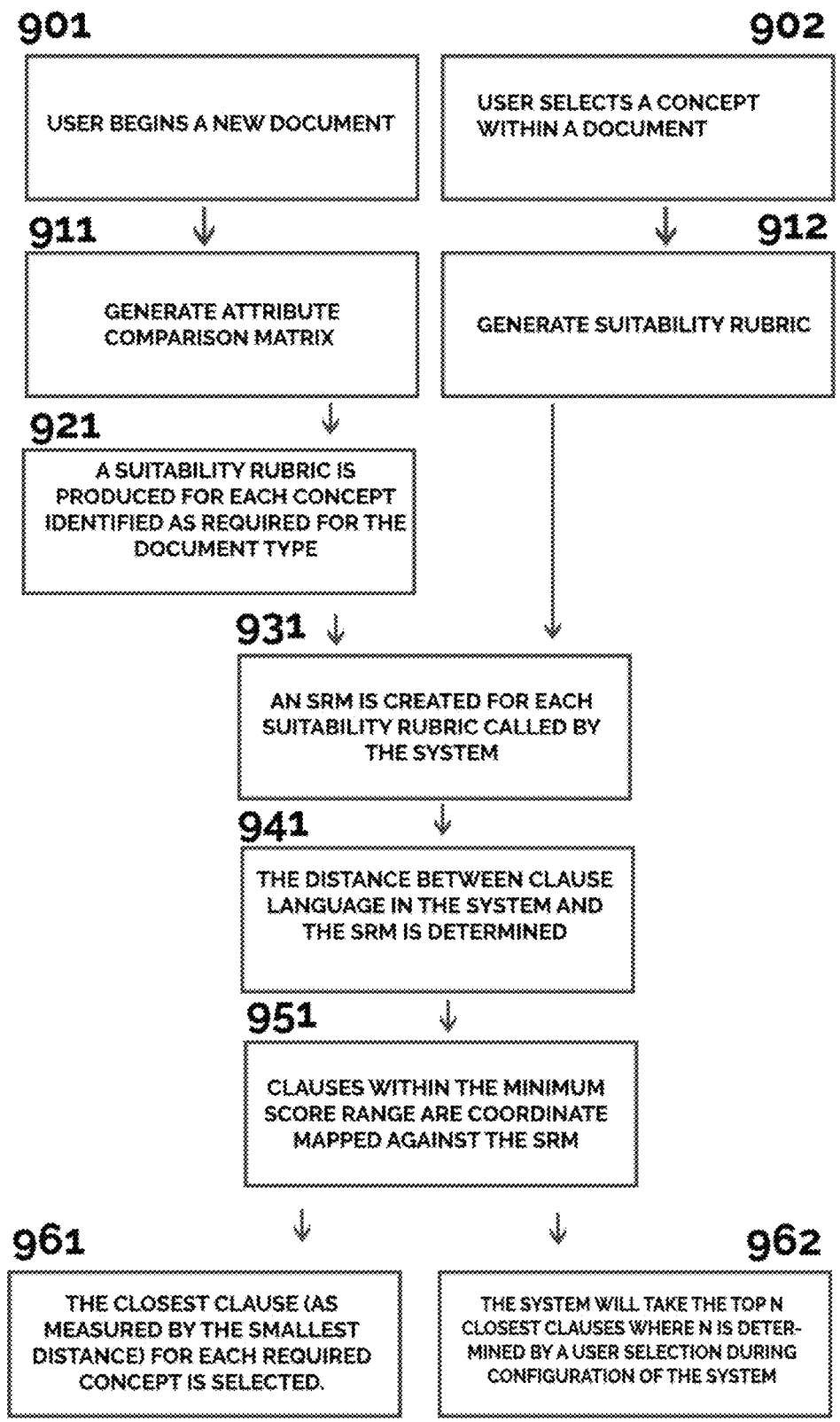
FIG. 9 is a block diagram that walks through of the processing of clause language against the suitability rubric illustrated in 231 of FIG. 2.

FIG. 9 is a walkthrough of the processing of clause language against the suitability rubric, FIG. 2, 231 (Generate the relative location of the clause language on the suitability rubric based on the classification scores) to determine which clauses are most appropriate for a given context. The user begins a new document 901 (User begins a new document), or selects a concept within a document, 902 (User selects a concept within a document). If the user has selected a new document the system first generates a comparison all of the concept attributes required for the document, 911 (Generate attribute comparison matrix) and then produces a suitability rubric for each normalized concept, 921 (A suitability rubric is produced for each concept identified as required for the document type). If the user selects a concept, a suitability rubric (SR) is generated for the concept, 912 (Generate suitability rubric). An SR Metric (SRM) is generated for each suitability rubric, 931 (An SRM is created for each suitability rubric called by the system). The distance between the SRM and clause language within the concept is calculated, 941 (the distance between the clause language in the system and the SRM is determined). Clauses that meet the minimum distance requirements are mapped against the SRM, 951 (clauses within the minimum score range are mapped against the SRM). Where a whole document is generated, the system will generate the closest clause for each required concept, 961 (The closest clause (as measured by the smallest distance) for each concept is selected). Where the use is selecting a single clause, a number of clauses match the criteria for selection are presented, 862 (The system will take the top N closest clauses where N is determined by a user selection during configuration of the system).

FIG. 10

FIG. 10 is a visualization of the mapping process described in FIG. 9. The SRM (represented by a sphere and clauses (represented as triangles and squares) are mapped on a 3-axis graph, showing their positions based on their Identity, Operational, and Qualitative weighted scores. Identity metrics represent the distinguishing characteristics categorization elements of a clause, i.e. the clause type (Governing Law). Operational metrics refers to the objective terms contained within the clause, i.e. a term or duration. Qualitative metrics represent the interpretive elements of clause language, i.e. equitability and tone. The Minimum Score Range (MSR) cut-off is displayed as a sphere. Clauses outside of the MSR (squares) are not considered appropriate language options. Clauses within the MSR (presented as triangles) are considered acceptable options for presentation or selection. Clauses within the SRM are measured against the location of the SRM to determine the closest matching clause language.

What follows is a detailed description of each process in the preferred embodiments of the invention. The below description is directed to a software platform that engages users within a document file and preferably using a web-based interface. The invention may also be embodied as a standalone program on a stored program computing apparatus.

Classification

FIG. 2 is directed to the processing of extracted language. As described above in FIG. 1, 101, language extraction is carried out through human extraction of data, or via machine extraction of information, FIG. 2, 201 (Extract clause language from documents uploaded from extraction or pre-existing in the document database). Extracted clause language is categorized by the utility of the clause, FIG. 2, 211 (Categorize Clause language extracted based on the type and the intended purpose of the clause). Utility categorization provides identity information for Clause Language. Identity classification is the process by which a cluster of language, most notably a clause, but additionally a document as a whole, or a specific section of a document, e.g. an Appendix, is assigned values designating the specification characteristics of that language. Consider a Governing Law clause in a non-disclosure agreement. The identity characteristics of such a clause are: the clause type (governing law); the document type (non-disclosure agreement); and the clause location (i.e. section 12 Miscellaneous) these characteristics provide the baseline traits necessary for selection and use of language; what should it go in, and where should it go.

Identity category information is then attached to the extracted language in the database, or before the extract language is transferred to the Clause Library (111) database, FIG. 7, 711. This identity information is used to create a base language profile, FIG. 6, 601. The current invention can be distinguished from prior identification methods used in document automation by applying a fluid classification post identification.

Once extracted clause language is populated with identity classification, it is compared against other language in the system with equivalent or similar identity classifications. This process is carried out in stages. First, clause language is assigned qualitative and operational attributes based on attributes present in other clauses within the legal language concepts required by the document type. Second, clause language is assigned operational and qualitative attributes based on presence in other clauses containing the same or similar clause type. This process continues until all potential baseline attributes have been assigned to the extracted clause language. Once known attributes are assigned, the system may assign new baseline attributes as appropriate based on analysis of the extracted language. For example, where a newly extracted notice clause may contain an operational trait not previous found in the document type or clause type, e.g. Suite Number, the system will create an assign this new operational trait to the clause. This new assignment is stored with other baseline attributes in the Clause Library (111), FIG. 8, 812. Where baseline attributes found in equivalent or similar clause language are not present in the newly extracted clause, the baseline trait remains assigned with a null value, FIG. 2, 221. Where baseline attributes found in equivalent or similar clause language is present, the system generates a metric value for baseline trait in the newly processed clause. This metric value is determined by analyzing the clause language and parsing the operational or qualitative language within. Operational metrics are determined by the precise value of the data. For example, in a governing law clause, the operational metric of "State" will be the "State" given in that section of the governing law clause. For qualitative metrics, this method uses a rules-based comparison to determine the qualitative value of language presented in the clause. This process completes the base categorization of the extracted clause language.

FIG. 2, 231, (Generate the relative location of the clause language on the suitability rubric based on the classification scores) is directed to the comparison of the newly extracted clause language to a SRM generated by an Author during the authoring process. This process is described in detail in FIG. 9. By mapping out the weighted average scores of identity, operational, and qualitative metrics, the system generates a three axis coordinate which is mapped against other clauses meeting the requirements generated by the Author. This process is described in greater detail in FIG. 3.

FIG. 3 is directed toward the creation of the Suitability Rubric SR and Suitability Rubric Metric SRM. As described in FIG. 1, 102 (Rubric Activation) the Suitability Rubric and SRM are critical to the application of the preferred embodiment of this method.

The Suitability Rubric

A unique factor in this method's ability to select, classify, and generate clause language is the creation and use of a Suitability Rubric. A suitability rubric (SR) is created by specifying desired classification attributes and granting each attribute a weighted value which, when combined, generates the SRM and determines the location of the "optimal" clause on the rubric, FIG. 3, 301.

The SR is a 3 axis map (See FIGS. 9 and 10) with values ranging from 0 to 100 on each axis. Identity, Operational, and Qualitative metrics each occupy an axis of the rubric. A score value of 100 represents a maximum score for a metric. A score value of zero (null) represents the lowest score for a metric. Metrics used to calculate scores on the SR are determined by the baseline metrics required by a legal concept. These metrics are weighted, by Author configuration at the creation of a Generation Model, and averaged to create a composite score. This composite score is mapped onto the relative axis for the metric. For example, a governing law clause may have 2 identity categorization metrics: Document Type, and Clause Type. If weighting on these metrics is equal, a clause containing only one of these categorizations will have a 50 value on the Identity Axis. If weighting favors clause type, a clause containing the correct clause type, but incorrect or null document type could have a higher score, up to 100 (depending on weight.)

The SRM represents the perfect embodiment of the desired clause language. This does not mean the score value of the SRM is 100 on each access. In many cases desired qualitative and operational metrics will have lower values. Consider the following example of the qualitative metric enforceability. An Author generating a waiver of liability would like a moderate level of enforceability in the indemnification provision of the agreement. This will provide the final Author with greater protection than a clause that is highly enforceable. Accordingly, the desired qualitative metric will be below 100 for this SRM.

Organization Profile Building

This method provides for the inclusion of organization and Author data to provide guidance and constraints to determine the appropriate language necessary to meet a given context. Organization profile building is the process by which the required identity attributes and desired weighted qualitative and operational are assigned to a legal concept, FIG. 6, 621. This profile is used as the baseline to generate the SR for a given clause.

Legal Concept Assignment, 701 is an Author driven process. The Author enters the concept management section of the application by selecting the concept management menu option. The Author is directed to add a new concept, edit an existing concept, or delete an existing concept.

When an Author selects add new concept, the Author is directed to provide a new document type, or select a document type from those already available in the system. During the initial setup of the system, the Author will only be able to add a new document type. Authors may attach as many document types as are required per concept. The Author is prompted to provide the baseline required attributes for the concept, FIG. 6, 621.

This process is carried out by either selecting the "New Attribute" menu item, or selecting "Apply Attribute." When creating a new attribute, the Author is required to provide the following information: Attribute Name, Attribute Type, Attribute Key Words, and Attribute Tolerance.

The Attribute Name field is the internal name of the attribute.

The Attribute Type field is a drop-down menu wherein Author's select from Identification, Operational, or Qualitative.

Attribute Key Words is a menu wherein Authors can add "Key Words" that are used to define the parameters of the language required to apply a classification score for the attribute. In the Key Words menu, Authors can create new Key Words rule sets, edit existing Key Word rule sets, or delete Key Word rule sets. Authors provide rules by adding logical statements within each Key Word rule set.

Key Word rule sets require the Author to provide a Strength Score. This Strength Score is used to teach the system that value of certain rules relative to other language which may trigger the same attribute information.

Attribute Tolerance is a rule's-based validation menu that sets minimum and maximum values for values within attributes. When Attribute Tolerance is clicked, Authors are prompted to Add; Edit; or Delete a tolerance, FIG. 3, 311.

When adding a new tolerance, the Author is presented with a: Tolerance Name field;

Tolerance Operator field, and Tolerance Value field.

Tolerance name is the internal name field of the tolerance.

Tolerance operator is a dropdown selection of logical operators which can be used to create the tolerance: Greater than; Greater than or equal to; Equal to; Less than or Equal to; Less than; Is; Is Not; Like.

Tolerance Value is the value associated with the attribute. For example, for the operational attribute "Term" 10 years may be the attribute value.

Authors may add as many tolerances as are necessary for each attribute.

Once an Author has completed an attribute, the Author is prompted to "Add additional attribute" or "Close Concept". Add Attribute prompts the Author to create a new attribute, or apply an attribute. Close concept closes the concept bringing Authors to the concept management page.

New baseline attributes may be assigned to a concept by the system during updates and other event-based triggers. System created attributes are labeled accordingly, FIG. 8, 851.

Concepts may lose baseline attributes during updates and other event-based triggers. Attributes deemed outside of the paradigm, as determined by the process described in FIG. 8, 841, are labeled inactive. Inactive attributes are not applied during the creation of a Suitability Rubric.

Applying an Attribute will allow the Author to select from attributes previously created and attached to other concepts. An Author is able to search by attribute name and filter by attribute type to more quickly find the appropriate attribute to apply. Once the desired attribute is selected, Authors apply that attribute to the current concept by clicking Apply Attribute.

Editing an attribute will allow the Author to adjust the attribute name and attribute type. Further, Authors can toggle the attribute's activity status by checking or unchecking the Inactive box.

If the system is connected to a pre-populated Clause Library (111) database, concepts, document types, and attributes stored within the Clause Library (111) database will available for use, editing, and deletion.

Tolerance Configuration

As described in FIG. 3, 301 (Specify desired classification attributes and associated weighting) Tolerance configuration sets the minimum and maximum parameters for language used within the system. These parameters are created during initial setup of the system and cannot be modified by an automatic process of the system. Prevention of automatic intervention is required to maintain Paradigm integrity against the introduction of large datasets of outlying data for clause language extraction and classification. The introduction of such datasets is common in the event of a merger or acquisition.

Language Processing Engine Training

FIG. 3, 321 (Select and Score documents to be used for baseline creation) speaks to the initial and on-going manual training of the classification engine. During language extraction, the system flags the presence or absence of triggering language to determine if a baseline attribute exists in a given concept, FIG. 2, 221; FIG. 6, 612; FIG. 7, 701. Attributes assigned, but not supported by the presence of language, are granted a null value (a score of 0 out of 100). Language that is identified as being present in a clause is scored according to the strength of the language defining the presence of the attribute.

Common examples of the baseline metrics used for qualitative scoring of a document include: Equitability, Enforceability, Quality, Readability, and Tone. Each scale is illustrated individually below to provide clarity to the process of generating attribute scores. During initial setup scoring is carried out manually. Once the system is taught the parameters, scoring is carried out automatically as a part of the classification process.

Scores from the newly extracted and processed language are compared to baseline language scores given during the initial method implementation process, FIG. 6, 611. These scores are additionally continually updated and adjusted based on event-based triggers, discussed below in FIG. 8.

Equitability of the extracted language is scaled from −100 to 100 with 0 representing a truly neutral agreement favoring neither of the parties. −100 and 100 are overly generous and draconian, respectively. For example, in an assignment clause equitability looks are the mutuality of language surrounding obligations. If obligation language is directed to a single party and such language creates a requirement to comply with stringent terms preventing assignment, the system will classify the language as highly draconian. If the language places the obligation on both parties, the clause is classified as neutral. Where the language directs the obligation to the authoring party, the language is classified overly generous.

Enforceability of the extracted language is scaled from 1 to 100 with 1 representing an unenforceable clause, and 100 representing a well-tested and proven enforceable clause. A 100 value does not guarantee perfection in the desirability of a clause. Rather, these are metrics regarding the strength of the language present. When authoring an agreement, a highly enforceable clause is not always desired. A waiver of liability may include unenforceable language to bolster protections or gain an advantage against an unsophisticated party who is unaware of the unenforceability.

Quality of the extracted language is scaled from 1 to 100 with 1 representing a clause that contains numerous spelling, grammar, and other errors, and 100 represents a well written, professional, clause. Unlike other metrics which are based on rules applied to the language, quality is based on the result of an analysis of the language. Where the system finds grammatical errors, the number of errors found directly lowers the quality score of the language.

Readability of the extracted language is scaled from 1 to 100 with 1 representing difficult to understand technical writing or legalese, and 100 representing plain, easy understood, clause language. Readability is an example of a highly flexible metric. Readability can be calculated mechanically looking at: word and character counts per sentence; Character counts per word; the presence of formatting marks (bolding, italics, underlines). Additionally, or conversely, readability can be determined by a thesaurus analysis of the text determining the rarity of the words used in the clause.

Tone of the extracted language is scaled from 1 to 100 with 1 representing a highly aggressive tone and 100 representing a soft, amenable tone. Tone is an example of a metric highly susceptible to Author interpretation. Rather than a logical rule, the presence or absence of Key Words is more likely to determine the Tone of a clause. For example, in a Governing Law clause language such as: "submit to the authority of the courts of Florida," would be consider more aggressive. Submit and Authority both imply an aggressive tone. Language such as: "The Governing Law of this Agreement is the law of the State of Florida" has a much less aggressive Tone and is scored more highly.

Extracted clause language is scored relative to guidelines given by the Author during the Generation Model process. Scores for each metric are attached to the extracted language either at the time the language is called for use, or are attached in storage if an update event triggers the evaluation of the closes without calling them for selection, FIG. 8, 801. Individual scoring and scaling may be adjusted manually, or automatically, as the system receives more input and more extracted language is added to the database, 801.

Operational metrics are attributes that are determined directly by the classification system and attached to the clauses, based on compliance with organizational tolerances, FIG. 6, 601. This embodiment of the invention provides two operational metrics (Prior Use and Amount) to illustrate how these metrics are defined and scored by the system.

Prior use is an operational metric controlled by the number of times this clause has been used in agreements within the platform. There are two variables associated with prior use. Presence or Absence; whether or not the clause has been recorded as used in a prior document, and if present, the amount of times a clause has been used. Unlike other attribute scores which operated independently to determine a score, prior use is determined by a comparison of other clauses within the concept. The clause with the most use is granted the highest prior use score 100 and other clauses are scored proportionately to their amount of use relative to the highest used clause. For example, if the concept Assignment Clause contains five (5) clauses, and the highest used clause has been used 10 times, a clause that has only been used five (5) times will receive a score of 50.

Amount is an operational metric attached to a numerical value. Herein the attribute value is pulled directly from the language within the clause without need for analysis. Scoring for Amount is also generated using a comparison of other Amount values within the same concept. However, unlike Prior Use, scoring for Amount is determined by deviation from the average value of the interquartile range (IQR), the measure of statistical dispersion of the dataset excluding the top and bottom 25% value. Higher deviation from the mean of the IQR generates a lower score. A value matching the mean generates a perfect score.

Once all concept attributes, tolerances, and scores are assigned, a SR can be generated based on the Author's desired use, FIG. 3, 331 (Generate the rubric which will be used to map the relative location of clause language based on classification scores). The SR is based on the author's tolerances as established by the creation of a generation model. This process is further described in FIG. 4, 401 (Build Author's profile based on drafting preferences questionnaire, and previously captured drafting information)

The Generation Model

Application of a fluid classification weighting serves to create a unique attribute classification score tailored to the specific use case of the individual selecting the clause or generating a document. Unlike standard classification systems, which classify and sort language into pre-created categories or "buckets" for use, fluid classification creates scores based on the clause language in relation to the current expected use. This fluidity in approach represents a departure from prior organizational practices, FIG. 7, 721.

To apply weighting against the baseline classification score, this method asks the Author to create Generation Models. Generation Models introduce parameters that define Attribute Weight Values and Attribute Target Values based on the document type, or end user.

Author's start by creating a New Model. To create a new model the Author is required to fill in the following fields: Model Name; Model Description; Clause Cap; and Minimum Score Range.

Model Name is the internal name of the model.

Model Description is a brief description of the model which is displayed adjacent to the model name.

Clause cap is the maximum number of clause options that will appear for selection by the Author when the model is used to select an individual clause for use.

Minimum Score Range (MSR) is the minimum score relative to the SRM that a clause must achieve to be considered as an option under the model, FIG. 9, 951. Whether or not a clause is within the MSR is calculated by the following equation:

$$MSR \geq \frac{x_1 + y_1 + z_1}{x_2 + y_2 + z_2}$$

Take the weighted average score of the clause language, x1+y1+z1, then divide it by the SRM, x2+y2+z2. If value is greater than or equal to the MSR value, the clause may be presented for selection 951.

Once a model is created the Author is required to designate document types and attributes to be controlled by the model. First the Author selects "Add Document Type." The Author is presented with a dropdown from which they select from available document types. Selecting a document type pulls in all concepts associated with the document type, and all Attributes associated with the concepts.

Next Authors provide Attribute values. Authors begin this process by clicking the "Add New Attribute" button and selecting from the previously created attributes in the system, or selecting from Attributes which are automatically populated based on the inclusion of document type concepts. For each attribute Authors add they must also provide an Attribute Weight Value and an Attribute Target Value.

The Attribute Weight Value is how the attribute is scaled in comparison to other attributes in the same attribute type category (identification, operational, or qualitative). Attribute Weight is set on a scale of 0 to 100 with the weight of all attributes of a type normalized using the following equation:

$$R = \frac{A_i}{\sum_{i=1}^{N} A_i}$$

R designates the relative weight of an attribute at the time of scoring.

A designates the value of the Attribute Weight.

The relative weight is equal to the Attribute Weight divided by the sum of the other attribute weights in the attribute type set.

For example; the generation model for a Non-Disclosure Agreement has 75 Attributes, and of those 75 qualitative metrics 25 are qualitative metrics. Each of those 25 qualitative metrics has an Attribute Weight between 0 and 100. The relative weight of any single Attribute is equal to that Attribute's Attribute Weight divided by the sum total of all 25 Attribute Weights.

The Attribute Target Value is how the Author designates the desired strength of language for the given Attribute. Take for example the qualitative metric: Enforceability. The desired level of enforceability for a given document, a waiver of liability, may be lower than the desired level of enforceability for a software license agreement. Accordingly, the Author may select a target value of 25, indicated enforceability language should be relatively weak.

FIG. 4, 411 (Build the generation model) speaks to the process by which Author's apply the generation model for use at the creation of a document, or when editing a document. As described in 4, 401 (Build the generation model) generation models are attached to document types. This manner of assignment represents the current workflow of the system, but does not prevent assignment by other means. For example, generation models can be attached based on the other party to the agreement, or any other variable the Author wishes to implement.

Once the generation model is attached to a document type, activating the model requires the Author to assign that document type classification to a document in the system. This process is carried out in two locations. First, during initial creation or import of a document an Author is prompted to provide two pieces of meta-data information: the document name and the document type.

The document name is the internal name used for the document.

The document type is the type value for the document used to associate the document with legal concepts and the generation model. An Author assigns a document type by selecting a type from a dropdown list.

Additionally, an Author may change a document type assignment at any time by editing the document's metadata. To do so, the Author selects "edit" from the context menu of the document. Within the edit menu, the Author is able to select and reassign a document type using a dropdown menu.

Generating the Suitability Rubric, SRM and Mapping the Closest Language

FIG. 4, 421 (Select ether single clause generation or whole document generation) is directed toward the creation of an SR 912, 921, an SRM 931 coordinate value, and the process of determining the closest matching clause language within the system, 941.

As discussed in FIG. 3, 301 (Specify desired classification attributes and associated weighting) the SR is a 3 axis map composed of the Identity Axis, Operational Axis, and Qualitative Axis. The SRM is a 3 axis coordinate which is the preferred embodiment of the clause language desired by the Author for the given context, FIG. 9, 931. Clause language for document generation and selection is determined by mapping clauses which meet the Minimum Score Range against the SRM on the SR, FIG. 7, 721. In the event of a single clause selection, the closest n number of clauses where n is the Clause Cap are presented for selection. Else, in whole document generation the closest matching clause is generated.

Clause language scores are compared using the following distance formula 941:

$$\text{Distance}(SRM, \text{Clause}) = |\sqrt{(x_2-x_1)^2+(y_2-y_1)^2+(z_2-z_1)^2}|$$

The coordinates (x1,y1,z1) for the SRM (SRM) represent the final metric values calculated from the Attribute Target scores multiplied by the specific weighting given to the legal concept, FIG. 5, 541. Clause language scores are determined by calculating the baseline classification scores of clause language identified as belonging to the same concept as the SRM, FIG. 5, 531. These scores are weighting according the attribute weightings for the desired concept and the calculated scores are plotted relative to the SRM. Distance is calculated as the absolute value between the two points, 941. Clause language showing a relatively low distance from the SRM is selected for selection consideration, or use in generation.

Suitability and organizational tolerance are measures that are often tailored based on each document type or clause purpose. For example, an indemnification clause may serve the same purpose regardless of whether a document is a master services agreement, or a confidentiality agreement, however a definition for a "Contractor" is likely to change significantly between an Intellectual Property transfer agreement and a real estate agreement. Depending on the legal concept at play, not all qualitative and operational metrics may be needed, or some attributes may have greater importance than others. Attribute specific weighting provides Authors the ability to provide a clearer expectation for what this invention should generate.

As described above, the SR provides a foundation which is used to map the relative locations of language classifications. Unlike in other systems where the foundation or basis for categorization is based on fixed values, because the SR is generated at the time of selection or clause generation, it is based on the immediate goals and tolerances of the organization and Author. The SR takes into account pre-selected ratings and combines that data with past and current drafting behavior to dynamically adjust the classification of language by usage category and the strength of scoring of such identified language. For example, as organizational tolerances shift requiring more stringent protections of certain rights, the SR for concepts containing these rights are adjusted to create a new foundation for what can be considered an "acceptable" classification for language concerning those rights.

Clause Selection and Generation

When an Author selects "New document" and after completing the required meta-data fields the Author is prompted to upload a document into the system, or generate a document based on the assigned document type.

Importing a document imports the document into the system.

Document Generation

FIG. 1, 121 (Document generation process) speaks to the process of generating a new document generates a document by identifying the required concepts for the document and providing clause language for each concept. For example, a simple Non-disclosure Agreement may have five (5) concepts: Caption, Confidential Information Definition, Notice, Assignment, and Term.

The system first looks at the list of required attributes for each of the concepts creating a matrix to identify overlapping attributes, 911. Where overlapping attributes exist, the system normalizes attribute weighting values to create a uniform weighting scale for the attributes across the concepts. Where concept attributes do not overlap, the system retains the weighting values provided. Once weighting values have been normalized across the concepts, the system generates a Suitability Rubric, 921 and SRM, 931 for each of the concepts. The clause most closely matching the SRM is selected and inserted in the appropriate location in the document 961. This process is repeated until all concepts in the document are populated, FIG. 1, 141; FIG. 7, 732.

Single Clause Generation

FIG. 1, 123 (Clause generation process) speaks to the process of producing a clause option for selection. While editing a document in the system an Author may at any time tag a clause as belonging to a legal language concept, 701. Where the system has auto-generated the document, or run the document through abstraction to automatically tag concepts, the appropriate concepts will be tagged in the document without requiring Author action.

Once concepts are tagged, an Author clicks the concept panel in the document to access the single clause selection options. At this time the system generates a Suitability Rubric 912 and SRM 331, 931 for the clicked concept. Depending on the generation model clause cap, FIG. 4, 401 (building the generation model) a number of clauses most closely related to the SRM, FIG. 2, 231 (generate the relative location of the clause language on the suitability rubric based on the classification score) are presented to the Author for selection, 962.

An Author then clicks "Select Clause" to insert the clause directly into the document at the location of the concept, FIG. 1, 141; 7, 732.

System Feedback

FIG. 4, 431 (Capture selection information from Author's choice to approve or reject the generated document or clauses) speaks to the process by which the system captures Author selection feedback from interactions with the concept panel. When clause selections are presented by the system a new table is added in the Clause Library (111) database for each of the presented clauses. This table captures the number of times the clause is selected by an Author in addition to the Author's profile identification number, FIG. 4, 441.

When an Author edits a concept in an autogenerated document the concept pane provides an icon allowing the Author to flag the currently selected clause language as inappropriate for the document. When the icon is clicked the Author is provided with menu to add and select from concept attributes. The Author can place a checkmark in the box next to the attribute to specify where the system erred in meeting the generation requirement.

When an attribute is flagged the baseline classification score for that attribute in the clause is reevaluated by the system, FIG. 4, 441.

This method additionally allows manual input of predefined concepts during the document generation process. This allows authors to change the requested parameters based on a presentation of language that did not meet their current authoring requirements, or the pre-determined requirements on the document type. For example, a Non-Disclosure Agreement may normally not require the legal concept of Force Majeure. However, in the present case, the author wishes to add this concept to the agreement. The Author can directly access the Clause Library (111), select the desired concept and insert the clause into the document. Based on the requested concept, the system will provide the most closely matching SRM parameters to the NDA document type, while providing for a deviation from Identity requirements to allow for the addition. Due to the unique nature of this addition, such action will generate a temporary deviation score for the selected language, the document type, and the Author's Authoring Profile, FIG. 8, 831.

Data Capture and Use

FIG. 1, 103 (Data Capture) is directed to the capture and use of captured data to improve the accuracy of attribute classification scores, the appropriate presence of attributes to concepts, and the appropriate weighting of attributes within a generation model.

The first stage of data capture occurs during the initial setup of the system, as discussed in FIG. 3, 321 (Select and score documents to be used for baseline creation).

After initial setup ongoing data capture is used to improve system-based classification and language scoring. When clauses are selected or used in document generation this event is captured and returned by the system, FIG. 6, 631, 632. In addition to capturing the operational metrics "selected" and the author's profile identification, the system also uses the selection to reinforce the Strength Score for Key Word Rule sets Consider for example the Key Word Rule set GDPR, for the Attribute Controlling Law, in the Concept Personally Identifiable Information. The GDPR Rule set is a simple logical statement: {text contains GDPR}, with an assigned Strength Score of 20 out of 100. Within the same Attribute there may also be a Key Word Rule: {text contains Europe} scored at 85 out of 100. When an Author makes selections of clauses for the Personally Identifiable Information concept if the Author continually selects clauses containing the text GDPR (meeting the requirement of the Key Word Rule set), the system will raise the Strength Score as the confidence interval of the presence of that language within the concept rises.

Strength Scores may also atrophy as clauses selected fail to show continued use of the language within the Key Word Rule set.

Classification Update Events

FIG. 8. 801 (clause language is trigged by an event causing an update to classification) is directed to process by which the system updates clause language classification scores and attributes. Updates are conducted both passively and actively in the system. Active updates are driven by Author interaction, either through system configuration, or manual adjustment of values. Passive updates are triggered based on system events.

Active Updates and Manual Update Configuration

This system allows for administrators to configure automatic reevaluation of all clause language within the Clause Library (111) database at a set interval, FIG. 8, 852. Authors create reevaluation parameters in the settings section of the configuration menu. Each parameter operates independently and multiple parameters can cover the same subset of clauses within the Clause Library (111) database.

To create a parameter an Author clicks "New" and is prompted to complete the following fields: Parameter Name; Parameter Description; Clause Set; Interval.

Parameter Name is the internal name of the parameter.

Parameter Description is a brief description of the rules of the parameter.

Clause Set allows Authors to restrict the clause set automatically re-evaluated by the parameter. Clause Set is divided into two tabs, Clause Library (111) and Document Type.

The Clause Library (111) allows Authors to restrict Clause Sets based on the following clause statuses: All, Archived, Inactive, and Unused.

All includes all clauses within the Clause Library (111) database.

Archived includes all clauses that have been archived either manually or through falling out of system tolerance.

Inactive includes all clauses that have been either manually or automatically configured inactive due to being determined inappropriate for the concept.

Unused includes all clauses which have not been selected for use in a document, or used for automatic document generation.

The Document Type tab allows Authors to restrict Clause Sets based on Document Type.

Document Types can be added using the "Add" button and once added are selected from a dropdown menu.

Interval is the period between automatic evaluation events. Authors select from the following intervals: Weekly, Biweekly, Monthly, Biannually, and Annually.

Whenever a new parameter is created, the system carries out an evaluation of all clauses within the parameter, FIG. 8, 852.

Passive Updates and Event-Based Triggers

To provide an accurate assessment of language's ongoing viability for use, this method requires regular adjustment to qualitative and operational metrics. This method employs an "event-based" adjustment to provide necessary updates to the system. The trigger events for this method occur during the following activities: new language is added to the system via manual input, or automated abstraction; language containing identity classification related prior classified language is used in a document, or ignored as a selection during document creation; an Author manually updates an identity classification or metric score on a clause; or a new concept is added to the system, FIG. 8, 801.

FIG. 8, 811 (Pre-existing classifications are measured relative to new standards and adjusted to match the new paradigm) speaks to the process by which pre-existing classifications are adjusted based on interactions with new organizational preferences or tolerances.

Where an event-based trigger changes the acceptable tolerance values of an attribute, all clauses containing that attribute are reevaluated based on the new paradigm. If a clause's language is outside of the tolerance, that clause is archived to await another paradigm shift. If the clause language still falls within the range of the tolerance, the attribute baseline classification score is recalculated to reflect any changes to the scoring system, FIG. 8, 811.

When a new attribute is added to a concept, clause language associated with that concept is evaluated for the presence or absence of that attribute. Where clause language does not contain the requisite elements to contain the attribute, a null score is generated. Where clause language meets the requisite elements Key Word Rule sets are applied to the clause language to generated a baseline classification score for the new attribute, FIG. 8, 812.

Where clause language is found to not require any adjustment in response to an event-based trigger, the scoring values of the language are increased to reflect compliance with the desired values, FIG. 8, 821.

Temporary Deviation

On occasion outlier events, or human error, may produce false data resulting in maladjustment of classification scores. The system protects against these events by creating a second Temporary Deviation Score, which is used in conjunction with the prior classification, until sufficient data has been captured to provide a high confidence level that the new concept paradigm represents a permanent shift in tolerance for the given language FIG. 8, 831.

When a deviation score is triggered, the system attempts to ascertain the nature of the deviation, whether it is an outlier or error, or whether it's the beginning of a new paradigm. There are two methods employed to obtain the required information. First the system may override the Clause Cap and present to present the deviant attribute as a selection obtain despite that clause not meeting the Minimum Score Range or relative location to the SRM. If the deviant clause is naturally selectable, having met the two requirements above, the system will ensure the presence of the most commonly selected clause for the concept type is also available, overriding the Clause Cap, if necessary, to do so, FIG. 8, 832.

Once solidified, language found to be outside the paradigm is declassified and archived by the system, FIG. 7, 731; 8, 841.

Once a trigger event occurs, as described above, all fluid classified language is brought into line with the paradigm for the identified concept, FIG. 8, 851.

The present invention is employed for use the selection of clause language during document generation, FIG. 5. While the concept of providing suggested language for use in document generation is well disclosed in prior art, this method is distinguished by the use of the SR and fluid classification of language to determine the closest possible matches to desired language from the full library of past documents fed into, or generated by the system. The advantage of this invention is that this method allows an author to generate a document or clause tailored to the specific relationship between the parties, rather than the mechanics of a transaction. Further, this method can be employed to produce individual clauses on demand, rather than being solely restricted to the creation of a certain document type.

While the forgoing written description of the invention enables one of ordinary skill to make and use what is presently considered to be the best mode thereof, those of ordinary skill will understand and appreciate the existences of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A computer implemented method of drafting a new document using language selection determined by the relational classification between language available in a database, and the desired clause language parameters comprising the steps of:

a) collecting user provided desired clause language parameters, either through real-time user interface, or using previously provided captured user language parameters;

b) collecting user provided input to determine a specific document type for generation;

c) analyzing the language available in the database to determine the baseline traits of the available language in the database to determine a baseline traits score;

d) determining the weighting of each clause language parameter based on the user provided desired clause language parameters having the same attribute type category: Identity, Operational, or Qualitative;

e) generating a Suitability Rubric (SR), formed from a 3 axis graph with each axis having a minimum value of zero (0) and a maximum value of one-hundred (100) having an identify axis, an operational axis, and a qualitative axis, wherein each axis' minimum value represents the weighted language parameter value of the language selection without any language matching the parameters and the axis' maximum value represents a combined weighted language parameter value of a language selection containing language with the highest possible amount of language matching the user provided desired clause language parameters;

f) creating a Suitability Rubric Matrix (SRM) by determining the optimum embodiment of desired clause language based on the user provided desired clause language parameters provided by the user, the SRM being mapped on the SR based on the baseline traits score matching the user's desired language parameter g) identifying relevant clause language from the subset of documents available in the database fitting a required document type parameter;

h) retrieving the relevant clause language from the document subset;

i) mapping each of the retrieved relevant clauses language on to the Suitability Rubric by multiplying the baseline traits score matching the user's desired language parameter by the Suitability Rubric axis weighting determined by the desired language parameters provided by the user;

j) determining the relative distance between each of the retrieved relevant clause language and the SRM by calculating the square root of the sum of the squared difference between each axis value of the 3 axis graph;

k) selecting clause language, meeting a preselected baseline traits score that most closely matches the user provided desired clause language parameters for inclusion for each of the retrieved relevant clause language; and l) populating the new document with the selected clause language.

\* \* \* \* \*